J. B. RHODES.
ROUTE INDICATOR.
APPLICATION FILED JULY 27, 1910.
1,005,474.
Patented Oct. 10, 1911.
4 SHEETS—SHEET 1.
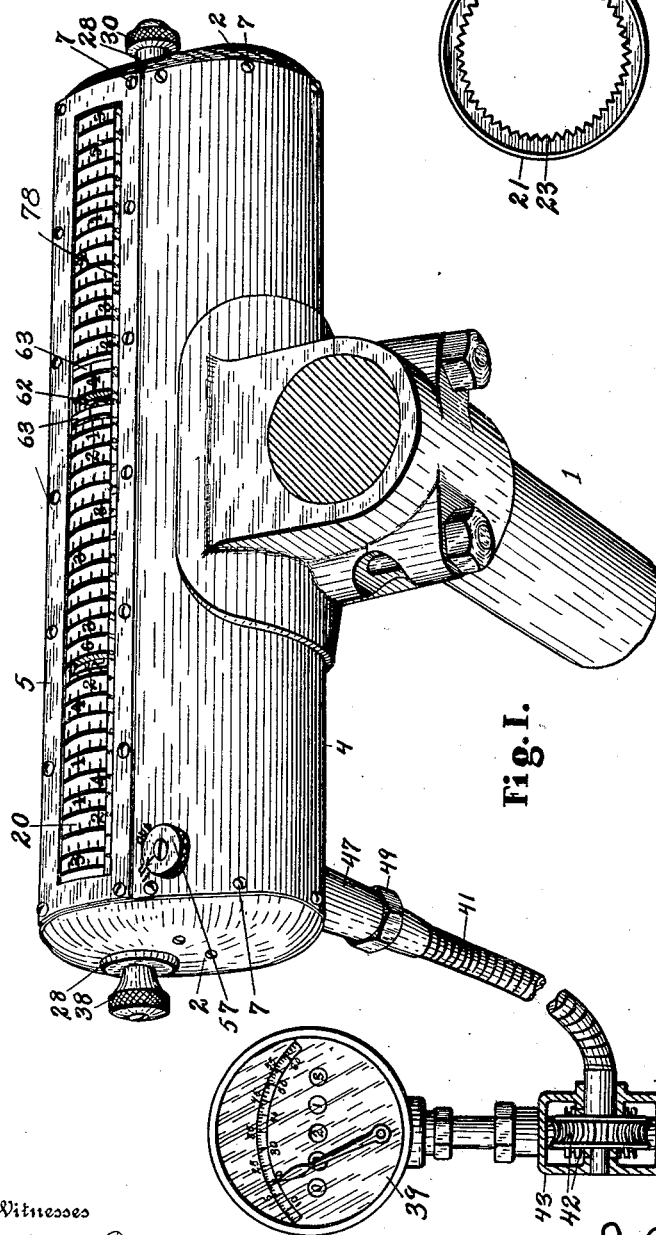
Witnesses
Gertrude Tallman
Clora E. Braden
Inventor
Jay B. Rhodes
Chappell Earl
By
Attorneys J. B. RHODES.
ROUTE INDICATOR.
APPLICATION FILED JULY 27, 1910.
1,005,474.
Patented Oct. 10, 1911.
4 SHEETS—SHEET 2.
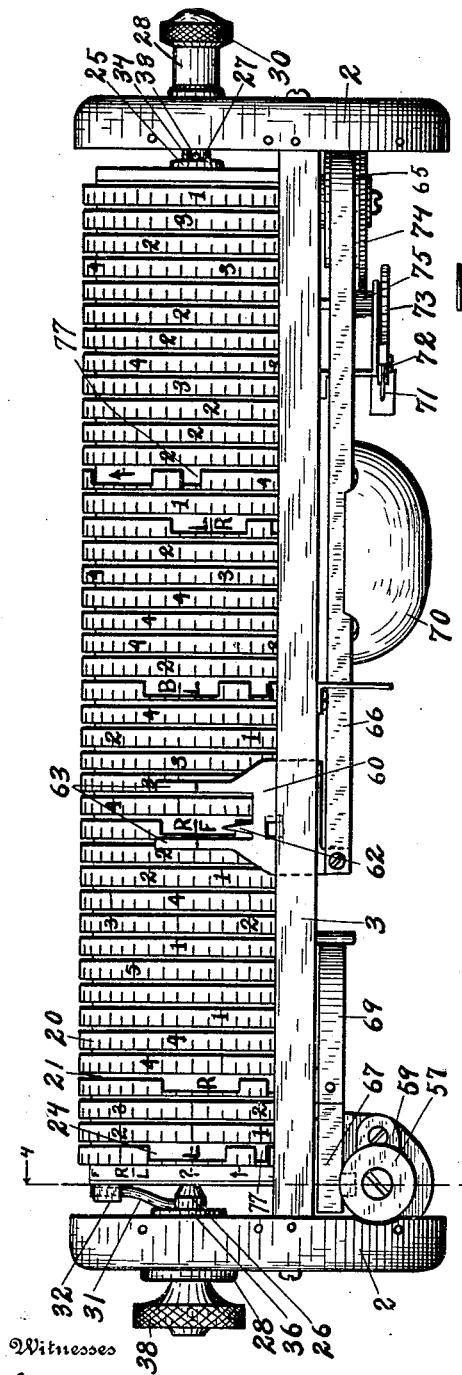
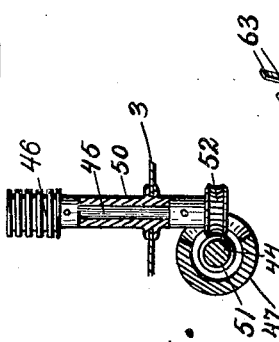
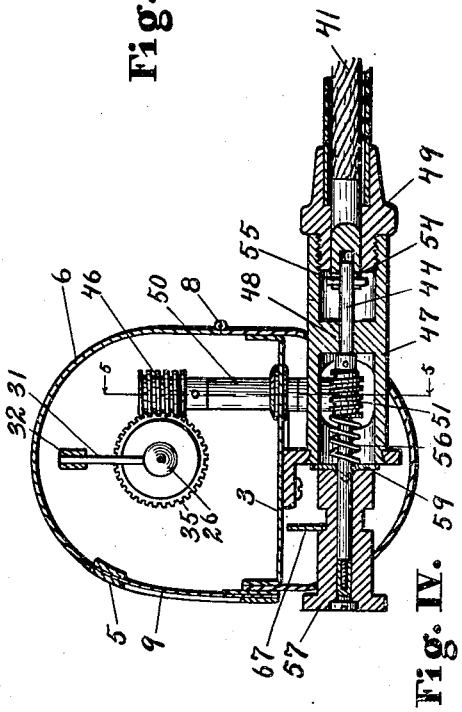

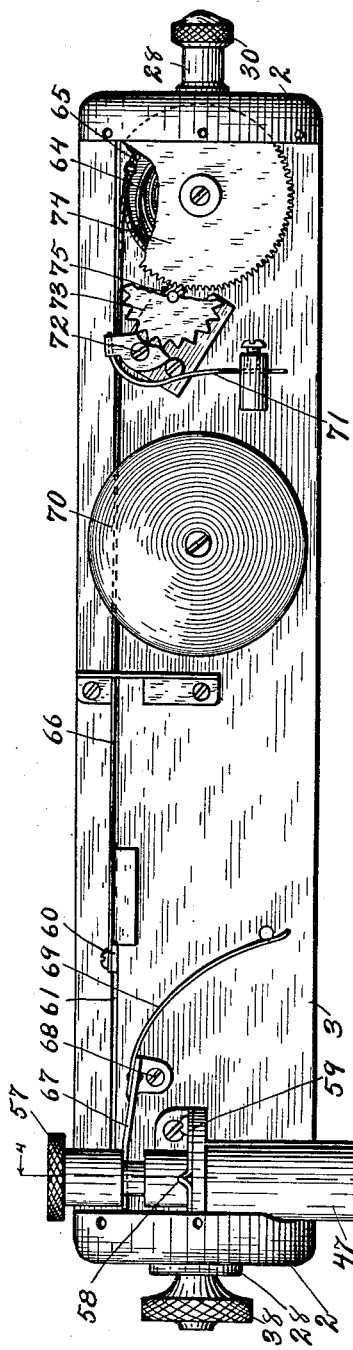

J. B. RHODES.
ROUTE INDICATOR.
APPLICATION FILED JULY 27, 1910.
1,005,474.
Patented Oct. 10, 1911.
4 SHEETS—SHEET 4.
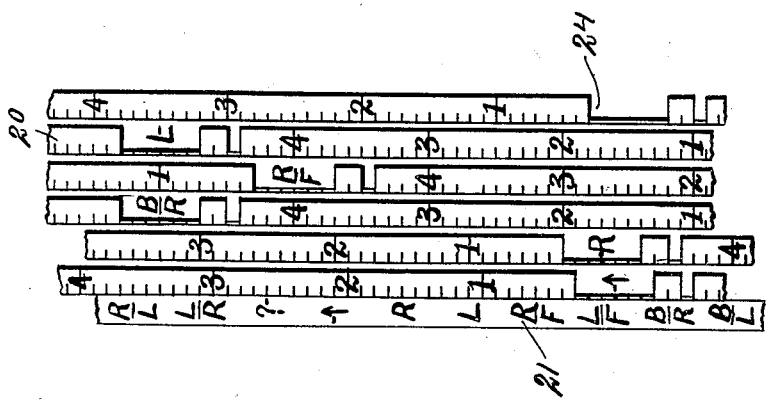
Fig. XII.
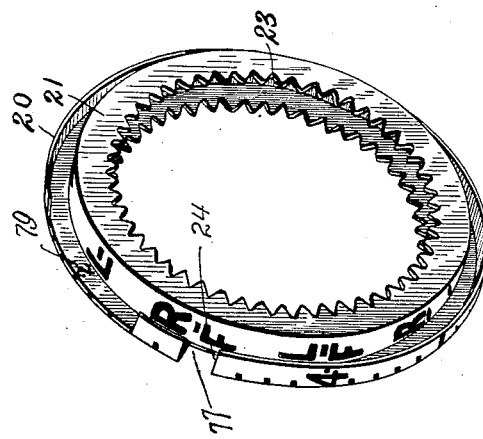
Fig. XI.
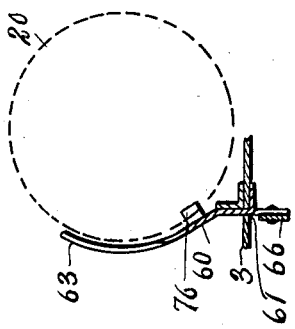
Fig. XIII.
Witnesses
Gertrude Tillman
Flora E. Braden
Inventor
Jay B. Rhodes
By Chappell & Earl
Attorneys

UNITED STATES PATENT OFFICE.

JAY B. RHODES, OF KALAMAZOO, MICHIGAN.

ROUTE-INDICATOR.

1,005,474.  Specification of Letters Patent.  Patented Oct. 10, 1911.

Application filed July 27, 1910. Serial No. 574,093.

*To all whom it may concern:*

Be it known that I, JAY B. RHODES, a citizen of the United States, residing at Kalamazoo, county of Kalamazoo, State of Michigan, have invented certain new and useful Improvements in Route-Indicators, of which the following is a specification.

This invention relates to improvements in route indicators.

The main objects of this invention are: First, to provide an improved route indicator or guide device, which may be quickly and easily set up for any desired route. Second, to provide an improved route indicator or guide device for use on vehicles, by which a route to a given place or places may be laid out in advance and the directions displayed as the route progresses. Third, to provide an improved route indicator which is compact in structure and can be readily mounted on the steering post of an automobile, or like vehicle. Fourth, to provide an improved route indicator in which the driving connections can be readily and easily made so that side trips from the route laid out are possible without affecting the indicator. Fifth, to provide in a route indicator an improved arrangement of the indicia members, whereby they are easily set up and the indicia are effectively displayed.

Further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

A structure constituting an effective and preferred embodiment of the features of my invention is clearly illustrated in the accompanying drawing, forming a part of this specification, in which:—

Figure 1 is a detail perspective view of a structure embodying the features of my invention, the same being shown in connection with a speedometer, the speedometer being illustrated in conventional form. Fig. 2 is a front view with the side walls of the casing removed. Fig. 3 is a rear view with the side walls of the casing removed, as in Fig. 2. Fig. 4 is a detail transverse section, taken on a line corresponding to line 4—4 of Fig. 2. Fig. 5 is a detail view, partially in section, taken on a line corresponding to line 5—5 of Fig. 4, showing structural details of the driving connections. Fig. 6 is a detail perspective view of the inner side of the index. Fig. 7 is a detail central longitudinal section through the indicia member shaft and its journals, taken on a line corresponding to line 7—7 of Fig. 8. Fig. 8 is a transverse section, taken on a line corresponding to the broken line 8—8 of Fig. 7, the pin 14 being shown in full lines. Fig. 9 is a perspective view of the indicia member shaft extended. Fig. 10 is a side elevation of one of the indicia members 21. Fig. 11 is a detail perspective of a pair of the indicia members, showing the relation of the direction to the distance indicia members. Fig. 12 is a diagrammatic view, further illustrating the relation of the indicia members and the route key indicia. Fig. 13 is a detail section through the index member 60.

In the drawing, the sectional views are taken looking in the direction of the little arrows at the ends of the section lines, and similar numerals of reference refer to similar parts throughout the several views.

Referring to the drawing, I preferably adapt my improved route indicator to mount the same upon the steering post of a motor vehicle, as 1, although the same may be readily adapted for mounting on any suitable part of the vehicle.

The casing for the mechanism preferably consists of the heads 2 connected by a partition plate 3. This plate is provided for convenience in mounting the parts. The casing is preferably oval in cross section, and is made up of sections 4, 5 and 6, the sections 4 and 5 being secured to the heads by means of the screws 7; whereas, the section 6 is hinged at 8 to permit the insertion or removal of the indicia shaft. The section 5 is provided with a window 9.

The indicia shaft 10 is preferably tubular, as illustrated, and is provided with an extension preferably consisting of the telescoping sections 11 and 12, adapted to telescope with the shaft. The extension section 11 is longitudinally slotted at 13 to receive the pin 14, carried by the shaft 10. The extension section 12 is slotted at 15 to receive the pin 16, carried by the extension section 11. The section 15 is also slotted at 17 to receive the pin 14, when the extension is telescoped into the shaft 10. The shaft 10 is provided with a head 18 at one end, and the outer shaft extension section 12 is provided with a similar head 19 at its outer end. When the extension is collapsed, as shown in Fig. 7, the head 19 is, in effect, a head for the shaft 10. A series of distance indicia members 20 and a series of direction indicia members 21 are provided. These members are adapted to be sleeved upon a shaft which is provided with a driving rib 22, adapted to engage the notches 23 in the indicia members, so that they are driven with the shaft, each indicia member being provided with engaging members so that they may be adjusted to bring the desired indicia into proper relation to lay out any desired route. The distance and direction indicia are alternately disposed upon the shaft, as indicated. The shaft extension is provided for convenience in setting up the route.

To set up a route, the indicia members are all slipped from the shaft upon the shaft extension, upon which they may be freely revolved, in order to bring them into proper relation. The distance indicia of the structure illustrated is provided with indicia indicating miles and tenths of miles, each member representing 4.9 miles. They could, of course, represent any desired distance, the same being marked according to the driving connections. The notches 23 are spaced according to the spacing of the indicia on the indicia members. After the indicia members are all properly placed upon the shaft, the extension is collapsed into the shaft. This retains the indicia members in place. The parts of the shaft have frictional engagement with each other for convenience in manipulation. The distance indicia members are preferably somewhat larger than the direction indicia members and provided with peripheral flanges so that the direction indicia members may telescope therein, as is clearly illustrated in the drawing. The distance indicia members are provided with openings 24, which are uniformly disposed relative to the mileage indicia.

In setting up a route, the proper indicia of the direction indicia members 21 are brought into register with these openings. For illustration, a route, as laid out in the diagrammatic view of Fig. 12, would read, the question mark being the starting point: 2.6 miles; straight ahead, 4.9; right, 1.7; bear right, 1 mile; right fork, 4 miles; left, 3.5 miles.

The shaft is supported so as to be readily removable to permit the adjustment of the indicia members, and this I accomplish in the structure illustrated by providing the shaft with journal seats 25 at each end for the journals 26 and 27, which are mounted in bearings 28 in the heads of the casing. The seats 25 in the ends of the shaft are preferably conical to receive the cone-shaped ends of the journals, which insures the centering of the parts. The journal 27 is mounted for longitudinal adjustment to permit the removal of the indicia member shaft, the spring 29 being arranged on the journal for holding it in engagement. On its outer end, the journal is provided with a finger piece 30. The journal 26 is provided with a driving member 31, adapted to be engaged with the driving members 32 on the shaft. The journal 27 is provided with a driving member 33, adapted to be engaged with the driving pin 34 on the shaft. On the journal 26 is a driving gear 35, which has a clutch engagement with the journal, the journal being provided with a fixed disk 36, a friction washer 37 being arranged between the face of the gear and the disk. The fingerpiece 38 is threaded upon the journal so that the clutch is actuated by turning the finger piece.

The device is driven from a vehicle wheel, suitable flexible shafts being provided, and is preferably driven in connection with the speedometer 39, which is shown in conventional form in Fig. 1. The shaft 40 is driven from the wheel and the shaft 41 is connected thereto by means of the gears 42. These gears are in a coupling member 43, which is adapted to be inserted between the driving shaft 40 and the speedometer. By this means, the route indicator may be connected in any machine equipped with a speedometer or an odometer, merely by mounting the route indicator upon the steering post, or other suitable part, and connecting the shaft 41 with the driving shaft 40. The shaft 41 could, of course, be connected directly to the vehicle wheel. The connections for the shaft 41 to the indicia shaft preferably consists of the worm shafts 44 and 45, the shaft 44 having a clutch connection with the shaft 41, while the shaft 45 is provided with a worm 46 arranged in mesh with the worm gear 35 on the indicia shaft journal 26. (See Figs. 4 and 5.)

The shaft 44 is arranged in a tubular support 47, having a bearing 48 therein, the outer end of the support being internally threaded to receive the coupling nipple 49 of the flexible shaft. The shaft 45 is supported in the bearing 50, carried by the casing plate 3. A worm 51, on the shaft 44, is arranged in mesh with the worm gear 52, on the shaft 45. The shaft 44, as stated, has a clutch connection with the flexible shaft 41, the clutch preferably consisting of the forks 54 on the shaft 41 and pin 55, on the shaft 44, the shaft 44 being mounted for longitudinal adjustment, so that, when the pin is withdrawn from the forks, the shafts are disconnected.

The spring 56 retains the clutch members in engagement. The clutch is disconnected by means of the finger piece 57, which projects through the casing. On the inner end of this finger piece is a cam notch, which coacts with the cam 58 on the plate 59. When the finger piece is turned, it rides up on the cam, thus moving the shaft 44 longitudinally to disengage it. This is of advantage in throwing the route indicator out of gear, as may be desirable to permit side trips or the like from the route set up in the indicator. Also, the distance between two given points or stations may vary somewhat from that given in the key from which the route is set up, so that the signal is given by the indicator before the station is reached, in which event, the route indicator should be thrown out of gear until the station is reached. In the event of running past a station, the driving gear is disconnected, and also the journal clutch described, when the indicia member shaft may be set back by means of the finger piece 30 on the journal 27.

For convenience in reading the indicator, I provide an index 60. This index is slidably mounted on a way 61,—see Figs. 6 and 13. The pointer 62 of the index is preferably arranged between a pair of arms 63, which further aid in the convenience of reading the indicator, as the portion to be read at any particular station is between these arms. For example, the particular direction which is indicated in Fig. 2 by the index is right-fork 3.4 miles. The index is driven or actuated by the spring 64, the spring being connected to the drum 65, and the cable 66 being connected to the index and to the drum to wind thereon. The actuating spring is wound as the index is drawn over to its initial position. The index is retained in this initial position by means of the catch 67, which is pivoted at 68 to the plate 3,—see Fig. 3. This catch is thrown into its engaging position by means of the spring 69. The finger piece 57 is adapted to release this catch 67, so that the index is released simultaneously with the throwing of the indicator in the gear. I also provide an alarm or signal, which is sounded upon each actuation of the index. This, in the structure illustrated, consists of the bell 70, which is mounted on the plate 3. The striker 71 is pivoted at 72 to be engaged by the toothed wheel 73. This wheel is connected by the gear 74 on the drum, and the gear 75 on the toothed wheel to the drum, so that it is driven thereby. The movement of the index is controlled by the indicia members, which are adapted to serve as temporary stops therefor, the index being provided with an engaging lug 76 which bears against the front sides of the indicia members 20 as they are revolved, and is adapted to pass through the release notches 77 when the notches are brought into register therewith. These notches are placed uniformly or similarly on each of the members 20 and in a uniform relation to the openings in the flanges of the indicia members. It will be obvious that, at each actuation or movement of the index, the signal is sounded.

My improved route indicator is, as before stated, easily and quickly set up for any desired route and changed from one route to another. In long trips, or trips exceeding the capacity of the device, a plurality of indicia shafts may be provided and set up at the starting point and inserted successively as the route progresses. As the shafts can be changed very quickly, practically no delay is incurred. The routes are set up from a route book in which the directions are given as stations. This does not mean stations in the sense of stops, but points where turns are to be made or instructions as to the route are required. In the route book, the series of stations comprising a route are consecutively numbered or provided with other suitable route key indicia. The scale-like route key indicia member 78 clearly appearing in Fig. 1 at the lower edge of the window of the casing has a series of route key indicia thereon corresponding to that used in the route key book, that illustrated being consecutive numerals, there being one of these numerals for each pair of direction distance indicia members. The distance indicia members 20 have corresponding route key indicia 79 thereon, see Fig. 11, the route key indicia numeral 2 appearing on distance indicia member 20 in this Fig. 11. These route key indicia are disposed on the rear sides of the distance indicia members 20, in alinement with the openings 24 in their peripheries, so that they can be read after a route is set up. By this provision, a route can be quickly and accurately set up and, further, after being set up, may be quickly checked for errors, as the route key indicia member enables the ready finding of the particular distance and direction indicia members.

I have illustrated and described my improvements in detail in the form in which I have embodied them, which form I find to be very satisfactory. I am aware, however, that my improvements could be very greatly varied in structural details without departing from my invention, and I desire to be understood as claiming the same specifically as illustrated, as well as broadly, within the scope of the appended claims.

Having thus described my invention, what I claim as new and desire to secure by Letters Patent is:

1. The combination of a tubular shaft having a flange-like head at one end and a longitudinal rib; an extension for said shaft comprising longitudinally slotted telescoping sections adapted to telescope into said shaft, said shaft and extension sections having friction engagement, the outer of said extension sections being provided with a flange-like head; pins on said shaft and the inner extension section engaging said slots; ring-like indicia members, said indicia members being freely revoluble on said shaft extension and being provided with internal notches spaced to correspond to the indicia thereon adapted to engage said rib on said shaft whereby the indicia members are driven with the shaft, said indicia members being retained by said heads.

2. In a structure of the class described, a tubular driven shaft having a flange-like head at one end and a longitudinal rib; an extension for said shaft comprising telescoping sections adapted to telescope into said shaft, the outer of said extension sections being provided with a flange-like head; and ring-like indicia members, said indicia members being freely revoluble on said shaft extension and being provided with internal notches spaced to correspond to the indicia thereon adapted to engage said rib on said shaft whereby the indicia members are driven with the shaft, said indicia members being retained by said heads.

3. The combination of a tubular shaft having a longitudinal rib; an extension for said shaft comprising longitudinally slotted telescoping sections adapted to telescope into said shaft, said shaft and extension sections having friction engagement; pins on said shaft and the inner extension section engaging said slots; and ring-like indicia members, said indicia members being freely revoluble on said shaft extension and being provided with internal notches spaced to correspond to the indicia thereon adapted to engage said rib on said shaft whereby the indicia members are driven with the shaft.

4. In a structure of the class described, the combination of a driven shaft, an extension for said shaft comprising a plurality of telescoping sections adapted to telescope with said shaft, and ring-like indicia members, said indicia members being freely revoluble on said shaft extension and having driving engagement with said shaft when arranged thereon.

5. In a structure of the class described, the combination of a driven shaft having a longitudinal rib, a telescoping extension for said shaft, and ring-like indicia members, said indicia members being freely revoluble on said shaft extension and being provided with internal notches adapted to engage said rib on said shaft whereby the indicia members are driven with the shaft.

6. In a structure of the class described, the combination of a driven shaft, an extension for said shaft adapted to telescope therewith, and ring-like indicia members, said indicia members being freely revoluble on said shaft extension and having driving engagement with said shaft when arranged thereon.

7. The combination of a tubular shaft having a longitudinal rib, an extension for said shaft comprising a plurality of telescoping sections adapted to telescope into said shaft, direction indicia members, distance indicia members disposed alternately with said direction indicia members and having peripheral flanges adapted to receive the same, said flanges having uniformly disposed openings therein, said indicia members being freely revoluble on said shaft extension and being provided with internal notches spaced to correspond to the indicia thereon adapted to engage said rib on said shaft whereby the indicia members are driven with the shaft.

8. The combination of a shaft; an extension for said shaft; direction indicia members; distance indicia members disposed alternately with said direction indicia members and having peripheral flanges adapted to receive the same, said flanges having uniformly disposed openings therein, said indicia members being freely revoluble on said shaft extension and having driving engagement with said shaft when arranged thereon.

9. The combination of direction indicia members, and distance indicia members disposed alternately, said direction indicia members being adapted to telescope into said distance indicia members, said distance indicia members having openings therein, said direction indicia members being adjustably associated with said distance indicia members whereby the desired indicia thereon may be brought into register with said openings.

10. The combination of direction indicia members, and distance indicia members disposed alternately, said direction indicia members being adjustably associated with and adapted to telescope into said distance indicia members.

11. The combination of a distance measuring device comprising a shaft, distance indicia members adjustably associated with said shaft, said distance indicia members being provided with route key indicia and with similarly disposed direction indicia openings, and direction indicia members disposed alternately with said distance indicia members and adjustably associated with said shaft, whereby the desired direction indicia may be brought into register with said openings.

12. The combination of a distance measuring device comprising a shaft, distance indicia members adjustably associated with said shaft, said distance indicia members being provided with route key indicia, and direction indicia members disposed alternately with said distance indicia members and adjustably associated with said shaft.

13. The combination of adjustable distance indicia members, said distance indicia members being provided with route key indicia, and direction indicia members disposed alternately with said distance indicia members and adjustably associated therewith.

14. The combination of a distance measuring device comprising a shaft, route indicia members adjustably associated with said shaft, said indicia members being provided with route key indicia, and a route key indicia member arranged parallel with said shaft, and adjacent to the peripheries of said indicia members, and having route key indicia thereon corresponding to the route key indicia on said route indicia members.

15. The combination of a distance measuring device, comprising a series of adjustable route indicia members, said route indicia members being also provided with route key indicia, and a route key indicia member associated with said route indicia members and having route key indicia thereon corresponding to the route key indicia of said route indicia members.

16. The combination of a distance measuring device comprising a shaft, driving connections for said shaft comprising a clutch, ring-like indicia members adjustably associated with said shaft, an index, a way therefor, said index being adapted to engage said indicia members, a spring for actuating said index, said indicia members being provided with similarly disposed release openings for said index, a catch for retaining said index in its initial position, and means for actuating said clutch adapted to disengage said catch.

17. The combination of a distance measuring device comprising a shaft, ring-like indicia members adjustably associated with said shaft, an index, a way therefor, said index being adapted to engage said indicia members, a spring for actuating said index, said indicia members being provided with similarly disposed release openings for said index.

18. The combination of a distance measuring device comprising a shaft, driving connections for said shaft comprising a clutch, ring-like indicia members on said shaft, an index, means for actuating said index, said indicia members being adapted to serve as temporary stops for said index, a catch for retaining said index in its initial position, and means for actuating said clutch adapted to disengage said catch.

19. The combination of a distance measuring device comprising a shaft, ring-like indicia members on said shaft, an index, and means for actuating said index, said indicia members being adapted to serve as temporary stops for said index.

20. The combination of a distance measuring device comprising a shaft, ring-like indicia members adjustably associated with said shaft, an index coacting with said indicia members, said indicia members being adapted to serve as temporary stops for said index and to release said index at predetermined points, and means for actuating said index.

21. The combination of a distance measuring device comprising an indicia shaft, having journal seats at its end, journals adapted to engage said seats, said shaft and journals being provided with coacting driving members, a driving gear on one of said journals having a clutch connection therewith, the other journal being mounted for longitudinal adjustment, and a spring for holding said journal in engagement with said shaft.

22. The combination of a distance measuring device comprising an indicia shaft having journal seats at its ends, journals adapted to engage said seats, said shaft and journals being provided with coacting driving members, and driving connections to one of said journals, the other journal being mounted for longitudinal adjustment whereby said shaft may be engaged or disengaged with said journals.

23. The combination of a distance measuring device comprising an indicia shaft having journal seats at its ends, journals adapted to engage said seats, said shaft and journals being provided with coacting driving members, a driving gear on one of said journals having a clutch connection therewith, and a finger piece threaded upon said journal for actuating said clutch.

24. The combination of a distance measuring device comprising a shaft; distance indicia members and direction indicia members adjustably associated with said shaft, the direction indicia members and the distance indicia members being disposed alternately in coacting pairs, each pair of said members being provided with route key indicia.

25. The combination of a distance measuring device comprising a shaft; ring-like distance indicia members adjustably associated with said shaft; ring-like direction indicia members adjustably associated with said distance indicia members; and an index adapted to engage said distance indicia members, said distance indicia members being provided with release openings for said index, said direction indicia members being smaller than said distance indicia members to permit the engaging portion of said index to pass through said openings.

In witness whereof, I have hereunto set my hand and seal in the presence of two witnesses.

JAY B. RHODES. [L. S.]

Witnesses:
 CLORA ELLYN BRADEN,
 F. GERTRUDE TALLMAN.

Copies of this patent may be obtained for five cents each, by addressing the "Commissioner of Patents, Washington, D. C."